United States Patent
Pundak et al.

(10) Patent No.: US 11,513,631 B1
(45) Date of Patent: Nov. 29, 2022

(54) ELECTRICAL NOISE ESTIMATION FOR TOUCH-SENSITIVE ELECTRODES

(71) Applicant: Microsoft Technology Licensing, LLC, Redmond, WA (US)

(72) Inventors: Gilad Pundak, Rehovot (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/319,077

(22) Filed: May 12, 2021

(51) Int. Cl.
*G06F 3/041* (2006.01)
*G06F 3/14* (2006.01)
*G06N 3/04* (2006.01)
*G06N 3/08* (2006.01)
(Continued)

(52) U.S. Cl.
CPC .......... *G06F 3/0418* (2013.01); *G06F 3/1423* (2013.01); *G06N 3/04* (2013.01); *G06N 3/08* (2013.01); *G06F 3/03545* (2013.01); *G06F 3/044* (2013.01); *G06F 2203/04108* (2013.01)

(58) Field of Classification Search
CPC .... G06F 1/1616; G06F 1/1618; G06F 1/1641; G06F 1/1643; G06F 1/1647; G06F 3/011; G06F 3/0304; G06F 3/0354; G06F 3/03545; G06F 3/041; G06F 3/0412; G06F 3/0413; G06F 3/0418; G06F 3/04182; G06F 3/044; G06F 3/0442; G06F 3/0443; G06F 3/0445; G06F 3/0446; G06F 3/0484; G06F 3/0488; G06F 3/04886; G06F 3/005; G06F 2203/04108; G06F 21/544; G06F 2203/04101; G01N 33/0006

See application file for complete search history.

(56) References Cited

U.S. PATENT DOCUMENTS 9,557,868 B2   1/2017   Agarwal et al.
9,710,112 B2   7/2017   Han
9,811,181 B2   11/2017  Shah et al.
(Continued)

OTHER PUBLICATIONS

Liubun, et al., "Hover Signal-Profile Detection", In Proceedings of IEEE 15th International Conference on Computer Sciences and Information Technologies (CSIT), Sep. 23, 2020, pp. 7-10.
(Continued)

*Primary Examiner* — Michael J Eurice
(74) *Attorney, Agent, or Firm* — Alleman Hall Creasman & Tuttle LLP

(57) ABSTRACT

A touch-sensitive display device includes one or more touch-sensitive displays each including a plurality of touch-sensitive electrodes. A free touch-sensitive electrode is identified on the one or more touch-sensitive displays that is (1) at least temporarily unaffected by proximity of one or more input objects to the one or more touch-sensitive displays, and (2) affected by an electrical noise caused by display of image content on the one or more touch-sensitive displays. The electrical noise affecting the free touch-sensitive electrode is measured. Based at least in part on the measured electrical noise affecting the free touch-sensitive electrode, and using a trained neural network, an amount of electrical noise caused by the display of image content that is affecting an occupied touch-sensitive electrode is estimated, the occupied touch-sensitive electrode being affected by proximity of the one or more input objects to the one or more touch-sensitive displays.

18 Claims, 7 Drawing Sheets

(51) Int. Cl.
G06F 3/0354 (2013.01)
G06F 3/044 (2006.01)

(56) References Cited

U.S. PATENT DOCUMENTS

| | | |
|---|---|---|
| 10,048,775 B2 | 8/2018 | Shahparnia et al. |
| 10,067,575 B2 | 9/2018 | Agarwal et al. |
| 10,452,106 B2 | 10/2019 | Cho et al. |
| 2014/0152576 A1 | 6/2014 | Kim et al. |
| 2014/0210737 A1 | 7/2014 | Hwang et al. |
| 2015/0378507 A1* | 12/2015 | Kurasawa ............. G06F 3/0416 |
| | | 345/87 |
| 2017/0192605 A1 | 7/2017 | Goudarzi |
| 2020/0103993 A1* | 4/2020 | Krah ................... G06F 3/04182 |
| 2020/0409491 A1* | 12/2020 | Maharyta ............ G06F 3/04166 |
| 2021/0117025 A1 | 4/2021 | Huang et al. |
| 2022/0019311 A1* | 1/2022 | Seyed Mousavi .... G06F 3/0418 |

OTHER PUBLICATIONS

"International Search Report and Written Opinion Issued in PCT Application No. PCT/US22/024153", dated Jun. 24, 2022, 17 Pages.

\* cited by examiner

200

```
┌─────────────────────────────────────────────────────────────┐
│ DISPLAY IMAGE CONTENT ON ONE OR MORE TOUCH-SENSITIVE        │
│ DISPLAYS EACH INCLUDING A PLURALITY OF TOUCH-SENSITIVE      │
│ ELECTRODES                                                  │
│                                                         202 │
└─────────────────────────────────────────────────────────────┘
                              │
                              ▼
┌─────────────────────────────────────────────────────────────┐
│ IDENTIFY A FREE TOUCH-SENSITIVE ELECTRODE THAT IS (1) AT    │
│ LEAST TEMPORARILY UNAFFECTED BY PROXIMITY OF ONE OR         │
│ MORE INPUT OBJECTS AND (2) AFFECTED BY AN ELECTRICAL NOISE  │
│ CAUSED BY DISPLAY OF IMAGE CONTENT                          │
│                                                         204 │
└─────────────────────────────────────────────────────────────┘
                              │
                              ▼
┌─────────────────────────────────────────────────────────────┐
│ MEASURE THE ELECTRICAL NOISE AFFECTING THE FREE TOUCH-      │
│ SENSITIVE ELECTRODE                                         │
│                                                         206 │
└─────────────────────────────────────────────────────────────┘
                              │
                              ▼
┌─────────────────────────────────────────────────────────────┐
│ BASED AT LEAST ON THE MEASURED ELECTRICAL NOISE, AND        │
│ USING A TRAINED NEURAL NETWORK, ESTIMATE AN AMOUNT OF       │
│ ELECTRICAL NOISE AFFECTING AN OCCUPIED TOUCH-SENSITIVE      │
│ ELECTRODE                                                   │
│                                                         208 │
└─────────────────────────────────────────────────────────────┘
```

FIG. 2

ELECTRICAL NOISE ESTIMATION FOR TOUCH-SENSITIVE ELECTRODES

BACKGROUND

A display device may include a plurality of touch-sensitive electrodes that enable detection of touch input caused by proximity of input objects to the display. The accuracy of touch input detection can be affected by electrical noise.

BRIEF DESCRIPTION OF THE DRAWINGS

FIG. 2 illustrates an example method for electrical noise estimation for a touch-sensitive display device.

DETAILED DESCRIPTION

A touch-sensitive display device may detect a touch input caused by proximity of a suitable input object to the surface of one or more touch-sensitive displays. As used herein, "touch input" refers to any input detected by a touch-sensitive display device that is caused by proximity or contact of an input object with the surface of a touch-sensitive display. Non-limiting examples of suitable input objects include human fingers, other portions of a human hand, styluses (including active and passive styluses), and suitable control devices (e.g., a dial control that attaches to the surface of the display).

Figure 1:
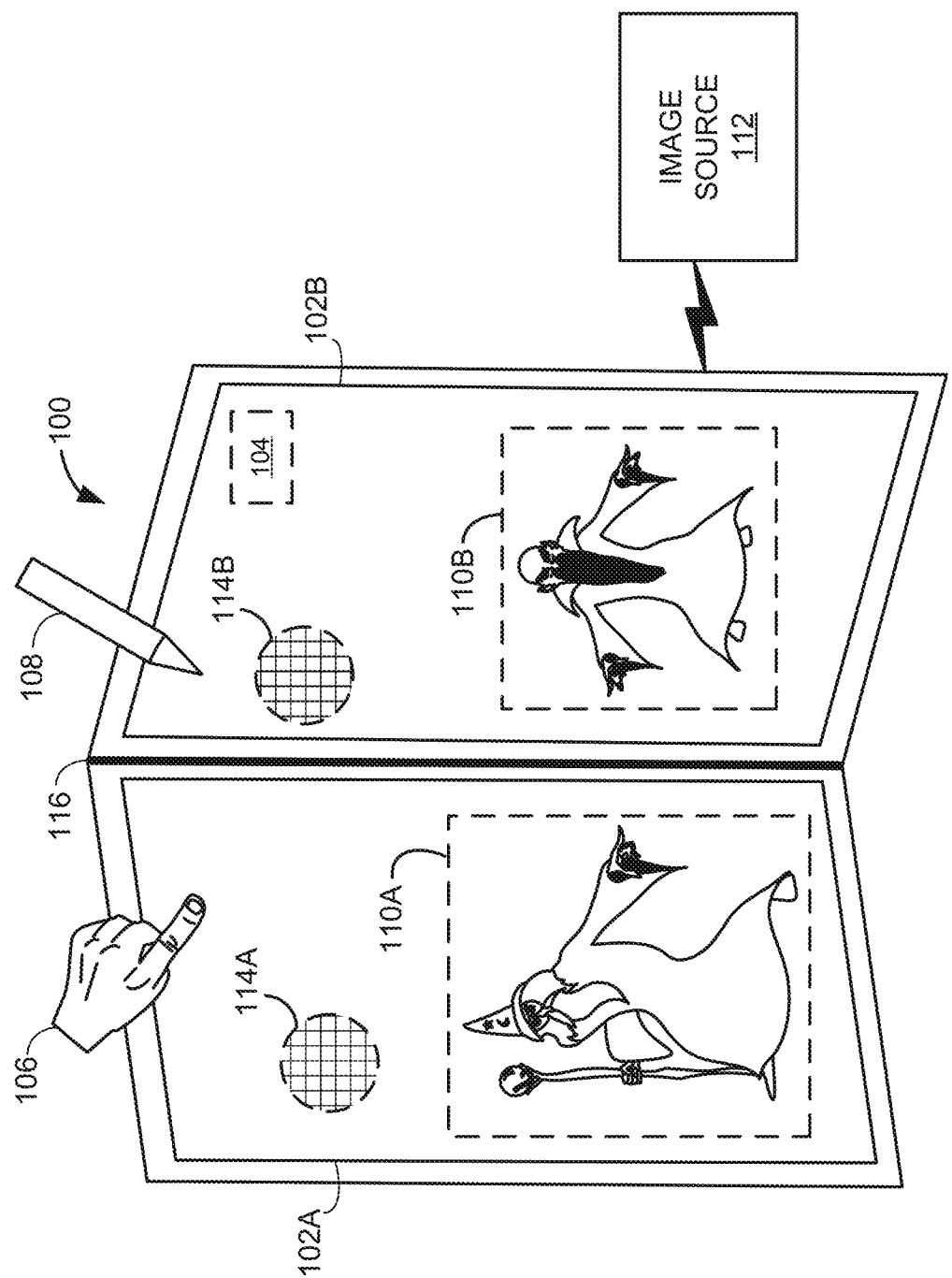
FIG. 1 schematically shows an example touch-sensitive display device.

This is schematically illustrated in FIG. 1, which shows an example touch-sensitive display device 100 including two touch-sensitive displays 102A and 102B. The touch-sensitive displays 102A/102B individually may have any suitable size(s) and dimension(s). In this example, the touch-sensitive display device includes two touch-sensitive displays, although this is not limiting. In other examples, a touch-sensitive display device may have a single touch-sensitive display or more than two touch-sensitive displays. In cases where the touch-sensitive display device includes two or more touch-sensitive displays, each display need not have the same size, shape, or resolution.

In some cases, a touch-sensitive display device may share a common housing with suitable computer hardware—e.g., such as in a mobile phone or tablet computer. In the example of FIG. 1, touch-sensitive display device 100 includes a controller 104 configured to perform any or all computing functions of the touch-sensitive display device. In other examples, however, the touch-sensitive display device may be a standalone peripheral display (e.g., a monitor or television) configured to present content received from a separate device or source via a suitable wired or wireless connection. In any case, a touch-sensitive display device may have any suitable form factor and hardware configuration. A touch-sensitive display device may be implemented as computing system 700 described below with respect to FIG. 7. Furthermore, controller 104 may be implemented via logic subsystem 702 and storage subsystem 704 described below with respect to FIG. 7.

In FIG. 1, a finger of a human hand 106 is contacting a surface of touch-sensitive display 102A, causing the touch-sensitive display device 100 to detect a touch input at the current two-dimensional position of the finger. Similarly, a stylus 108 is also contacting the surface of display 102B, causing the touch-sensitive display device to detect a touch input at the current two-dimensional position of the stylus.

Touch-sensitive display device 100 may in some cases display image content on either or both of displays 102A and 102B. In the example of FIG. 1, touch-sensitive display 102A is displaying image content 110A, while touch-sensitive display 102B is displaying image content 110B. Such image content may be received from an image source 112, which may take any suitable form. For example, the image source may include a computing device external to, or housed within, the display device 100.

The touch-sensitive displays may detect proximity of input objects in any suitable way, utilizing any suitable touch-sensing and/or hover-sensing technologies. For example, each touch-sensitive display may use a suitable capacitive touch sensor—e.g., relying on mutual capacitance or self-capacitance—although any touch and/or hover-sensing technologies may be used, including non-capacitive technologies. In FIG. 1, the first touch-sensitive display 102A includes a first plurality of touch-sensitive electrodes 114A configured to detect proximity of input objects to the first touch-sensitive display. Similarly, the second touch-sensitive display 102B includes a second plurality of touch-sensitive electrodes 114B configured to detect proximity of input objects to the second touch-sensitive display.

The touch-sensitive electrodes may, for example, detect a change in capacitance caused by proximity of an input object to a display surface, and/or detect touch inputs in other suitable ways. By monitoring electrical conditions at the plurality of touch-sensitive electrodes, controller 104 may determine the two-dimensional positions of any touch inputs relative to the surfaces of the touch-sensitive displays. The touch-sensitive electrodes and touch controller are shown with dashed lines to indicate that they are disposed beneath the display surface. The electrodes may have any suitable resolution(s) and/or coverage area(s) (e.g., 100% coverage across all display area or less than 100% coverage).

In cases where the touch-sensitive display device includes two or more touch-sensitive displays, as in FIG. 1, the two or more touch-sensitive displays may have any static or dynamic spatial and/or angular relationships with respect to one another. For example, in FIG. 1, touch-sensitive display device 100 further comprises a hinge 116 disposed between the first touch-sensitive display 102A and the second touch-sensitive display 102B. In this manner, an angular relationship between the first and second touch-sensitive displays may be dynamically adjusted.

The present disclosure describes touch input as being detected by the touch-sensitive display device in response to "proximity" of input objects to the surface of the touch-sensitive display. This may include situations in which the input objects directly contact the surface of the touch-sensitive display. In some cases, touch input may additionally be detected when the input objects hover in close proximity to the surface of the display—e.g., within a few centimeters—without directly contacting the display surface.

Regardless, the touch-sensitive display device may be configured to respond to touch inputs in a variety of suitable ways. In this manner, a user may control the touch-sensitive display device by intentionally bringing input objects into proximity with the touch-sensitive display. However, accurate and consistent detection of touch inputs may be compromised by various sources of electrical noise that may affect performance of the touch-sensitive display device.

Such electrical noise may in some cases be caused by the display of image content on the one or more touch-sensitive displays. This may occur due to interaction between the display refresh rate and the sampling rate of the touch-sensitive electrodes, when these two rates are not synchronized. For instance, when the display refreshes at the same time as touch sampling occurs at the touch-sensitive electrodes, display of image content may inject an electrical noise that interferes with accurate and consistent detection of touch input. While this display noise could potentially be avoided by engineering the touch-sensitive display device to synchronize touch sampling and display refresh, such that these processes always occur at different times, this adds significant complexity and expense to the design of the touch-sensitive display device.

To mitigate the effects of this electrical noise, the touch-sensitive display device may in some cases identify a "free" touch-sensitive electrode that is not currently detecting proximity of an input object, but is still affected by the electrical noise. For the purposes of this disclosure, a "free" touch-sensitive electrode is one that is not currently affected by proximity of an input object to a display surface corresponding to the electrode. It will be understood that an electrode may be "not currently affected" by proximity of an input object if less than a threshold percentage (e.g., 10%) of the signal reported by the electrode is caused by proximity of an input object, and "free electrodes" therefore need not exclusively include electrodes that are completely unaffected by any or all potential nearby sources of touch input. By contrast, an "occupied" touch-sensitive electrode is one that is currently detecting touch input from a nearby input object—e.g., electrodes reporting signals where higher than a threshold percentage (e.g., 10%) is caused by proximity of an input object. By measuring an electrical noise detected at a free touch-sensitive electrode, then subtracting the measured electrical noise from readings output by a plurality of occupied touch-sensitive electrodes, the touch-sensitive display device may more consistently and accurately detect the position of a touch input relative to the display surface.

However, situations may arise in which substantially all of the touch-sensitive electrodes of a touch-sensitive display are occupied. In other words, there may be no free electrodes that the touch-sensitive display device can use to characterize the electrical noise, then subtract the electrical noise from the signals reported by the plurality of occupied electrodes. This may occur, for instance, when the size of the touch-sensitive display is relatively small (e.g., a smartphone display), such that one or more input objects in proximity to the display surface are affecting substantially all of the electrodes of the display at once. As one non-limiting example, a user writing with a stylus while covering most of the display surface with their hand and palm may occupy substantially all touch-sensitive electrodes of the display, leaving no free electrodes useable to mitigate electrical noise. It will be understood, however, that any number of other situations may arise where substantially all of the touch-sensitive electrodes of a particular touch-sensitive display are occupied.

Accordingly, the present disclosure is directed to techniques for touch input detection for a touch-sensitive display device. Specifically, the present disclosure focuses on using one or more trained neural networks to estimate the amount of electrical noise affecting an occupied display electrode, based at least in part on an electrical noise measured at a free electrode. Notably, however, the free electrode may in some cases be on a different touch-sensitive display from the occupied touch-sensitive electrode. Additionally, or alternatively, the electrical noise measured at the free touch-sensitive electrode may be used to estimate an amount of electrical noise affecting the same electrode at a later time, when the electrode is occupied. In any case, the techniques described herein may be used to estimate the amount of electrical noise affecting an occupied touch-sensitive electrode, even when no free touch-sensitive electrodes are currently available on the same touch-sensitive display. In this manner, touch inputs may be more accurately resolved to two-dimensional positions relative to the surface of a touch-sensitive display, even in situations in which accurate input detection would otherwise be compromised by electrical noise.

FIG. 2 illustrates an example method 200 for touch input detection on a touch-sensitive display device. Method 200 may be implemented by any suitable touch-sensitive display device, having any suitable hardware configuration and form factor. Steps of method 200 may in some cases be performed by a suitable computer processor or other logic componentry, such as controller 104 described above with respect to FIG. 1. In some cases, method 200 may be implemented by computing system 700 described below with respect to FIG. 7.

At 202, method 200 includes displaying image content on one or more touch-sensitive displays of a touch-sensitive display device. This is schematically illustrated in FIG. 1, in which touch-sensitive display device is displaying image content 110A and 110B on touch-sensitive displays 102A and 102B.

It will be understood that the specific image content shown in FIG. 1 is only a non-limiting example. In general, a touch-sensitive display device as described herein may display virtually any image content on any or all touch-sensitive displays of the display device. As non-limiting examples, image content can include user interface content rendered by an application or operating system of the device, static images, indications of a user's touch input (e.g., an "ink" line that reflects movements of an input object across the display surface), and video content (e.g., from a local file rendered by the device, video streamed from a remote source, or a video signal provided by an external playback device).

Regardless of the nature of the image content, it will be understood that display of image content may cause or contribute to an electrical noise that affects touch-sensitive electrodes, as discussed above. In some cases, the nature of the image content (e.g., brightness, colors, patterns) may influence the nature of the electrical noise. Furthermore, the nature and/or intensity of the electrical noise may in some cases vary over time. For example, as discussed above, electrical noise related to display of image content may be caused by interaction between the rate at which display content refreshes, and the rate at which touch sampling occurs at the touch-sensitive electrode. Given this, while a particular input object is making contact with the display surface, electrical noise may occur semi-periodically, at a rate corresponding to the difference between the display refresh rate and the touch sampling rate. However, the semi-periodic rate at which electrical noise occurs may change each time an input object contacts the display surface, and therefore may not remain consistent over time.

Returning briefly to FIG. 2, at 204, method 200 includes identifying a free touch-sensitive electrode on the one or more touch-sensitive displays that is (1) at least temporarily unaffected by proximity of one or more input objects to the one or more touch-sensitive displays, and (2) affected by an electrical noise caused by display of image content on the one or more touch-sensitive displays. For the purposes of this disclosure, it is assumed that the touch-sensitive display device is capable of distinguishing free electrodes from occupied electrodes based on signals reported by the electrodes. As will be discussed in more detail below, the amount of electrical noise affecting a free touch-sensitive electrode can be used to estimate the amount of electrical noise affecting an occupied touch-sensitive electrode, even if no free electrodes are currently available on the same display as the occupied electrode. For example, the occupied electrode may be the same as the free electrode, albeit at a later time, meaning the prior electrical noise measured when the electrode was free can be used to estimate the current electrical noise affecting the electrode when it is occupied. As another example, the identified free electrode may be used to estimate an electrical noise affecting an occupied electrode that is on an entirely different touch-sensitive display of the same touch-sensitive display device—e.g., the free electrode may be on a first display of the display device, while the occupied electrode is on a second display of the same device.

Figure 3:
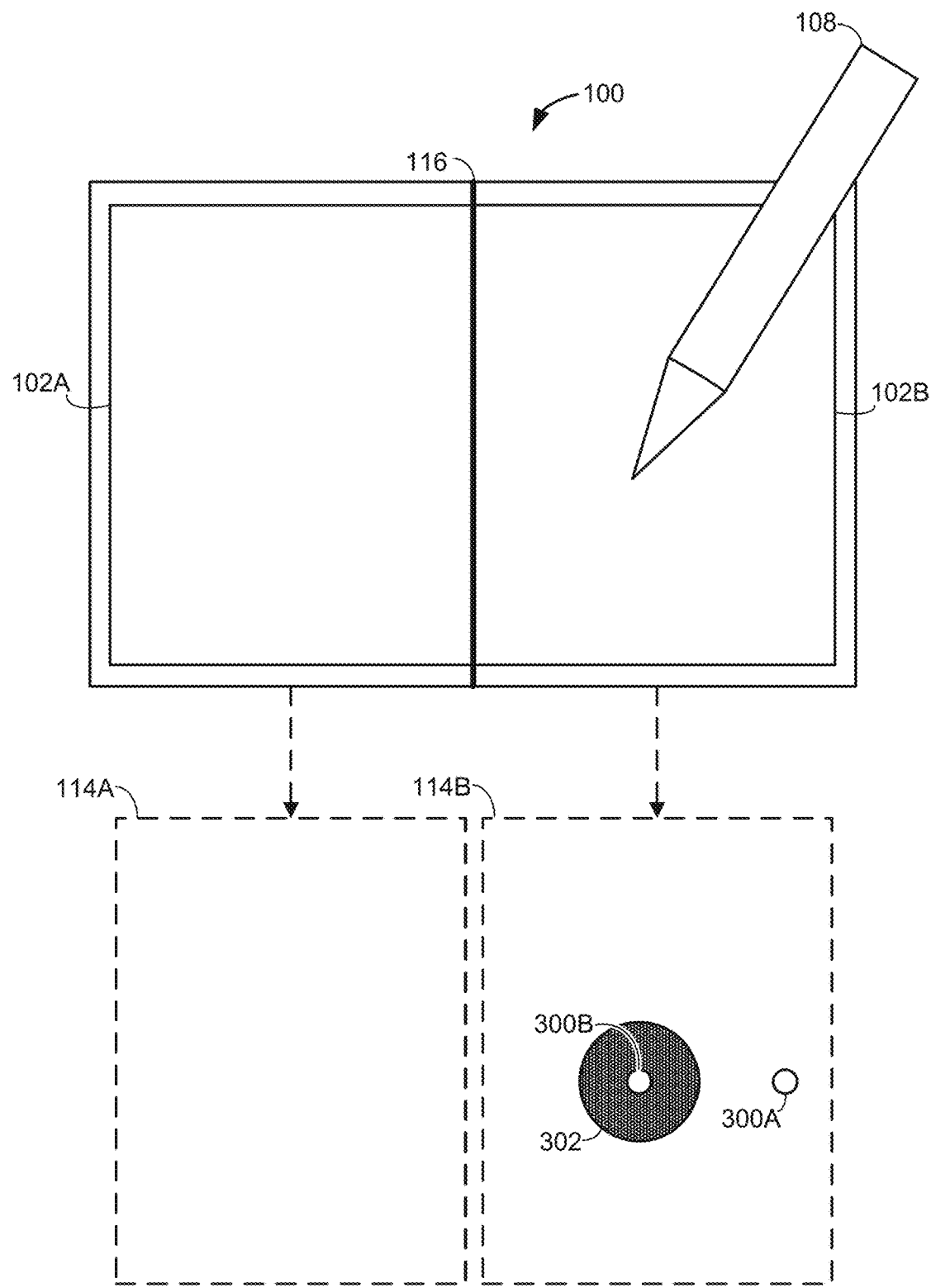
FIG. 3 schematically illustrates touch-sensitive electrodes affected by proximity of an input object.

Identification of a free touch-sensitive electrode is schematically illustrated with respect to FIG. 3. FIG. 3 again shows touch-sensitive display device 100, including first and second touch-sensitive displays 102A and 102B separated by hinge 116. Furthermore, in the example of FIG. 3, stylus 108 (shown with a larger size than in FIG. 1) is again providing touch input to touch-sensitive display 102B.

FIG. 3 also schematically illustrates activity of touch-sensitive electrodes 114A and 114B of touch-sensitive displays 102A and 102B. Touch-sensitive electrodes 114A and 114B are depicted as dashed rectangles, indicating a plurality of touch-sensitive electrodes disposed beneath the respective surfaces of touch-sensitive displays 102A and 102B. Though the individual touch-sensitive electrodes are not shown, the positions of two specific touch-sensitive electrodes 300A and 300B within the plurality of electrodes 114B are indicated by white circles.

Furthermore, in FIG. 3, some of the touch-sensitive electrodes 114B are affected by proximity of stylus 108. In other words, as the stylus approaches the surface of touch-sensitive display 102B, some of the touch-sensitive electrodes 114B react to the presence of the stylus—e.g., via a change in capacitance. The electrodes affected by proximity of the stylus are indicated in FIG. 3 by a circle 302 filled with a dark fill pattern. As shown, electrode 300A is outside of circle 302, indicating that electrode 300A is a "free" electrode that is unaffected by the proximity of stylus 108. By contrast, electrode 300B is within circle 302, indicating that electrode 300B is an "occupied" electrode that is affected by the proximity of stylus 108.

Notably, as described above, any or all of touch-sensitive electrodes 114A and 114B may be affected by electrical noise caused by display of image content on touch-sensitive displays 102A and 102B. When a free electrode is available, such as electrode 300A, the electrical noise affecting the electrode may be characterized and subtracted from occupied electrodes to more accurately detect touch input.

Figure 4:
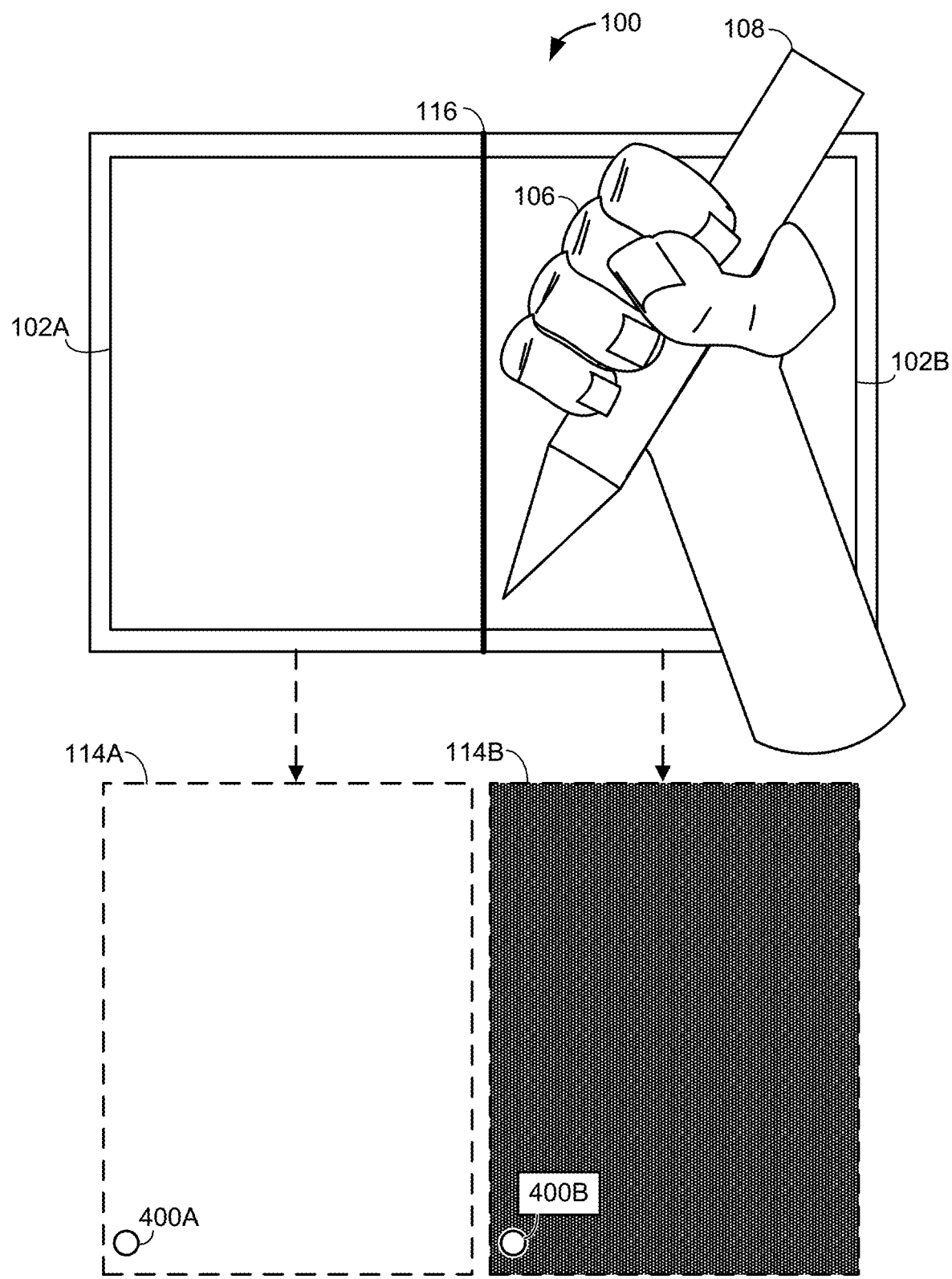
FIG. 4 schematically illustrates identification of free and occupied touch-sensitive electrodes on two touch-sensitive displays.

However, as discussed above, situations may arise in which there are no free electrodes available on a same touch-sensitive display useable to characterize an electrical noise caused by display of image content. This scenario is schematically illustrated with respect to FIG. 4, again showing touch-sensitive display device 100. In the example of FIG. 4, stylus 108 is being held by human hand 106, and both the hand and the stylus are contacting the surface of touch-sensitive display 102B. Given this, substantially all of the touch-sensitive electrodes 114B of touch-sensitive display 102B are affected by proximity of one or both of the stylus and the hand, as indicated by the dark fill pattern filling the entire dashed rectangle representing electrodes 114B.

FIG. 4 also shows the positions of two specific touch-sensitive electrodes (again indicated by white circles), including electrodes 400A and 400B. In this example, electrode 400A is a free electrode included in touch-sensitive display 102A. Electrode 400B is occupied, as is substantially every other touch-sensitive electrode of touch-sensitive display 102B. In other words, there are no free touch-sensitive electrodes on touch-sensitive display 102B useable to characterize, and thereby correct for, an electrical noise affecting electrodes 114B due to display of image content. However, as will be described in more detail below, an electrical noise measured at free electrode 400A may be used to estimate the amount of noise affecting occupied electrode 400B.

Figure 5:
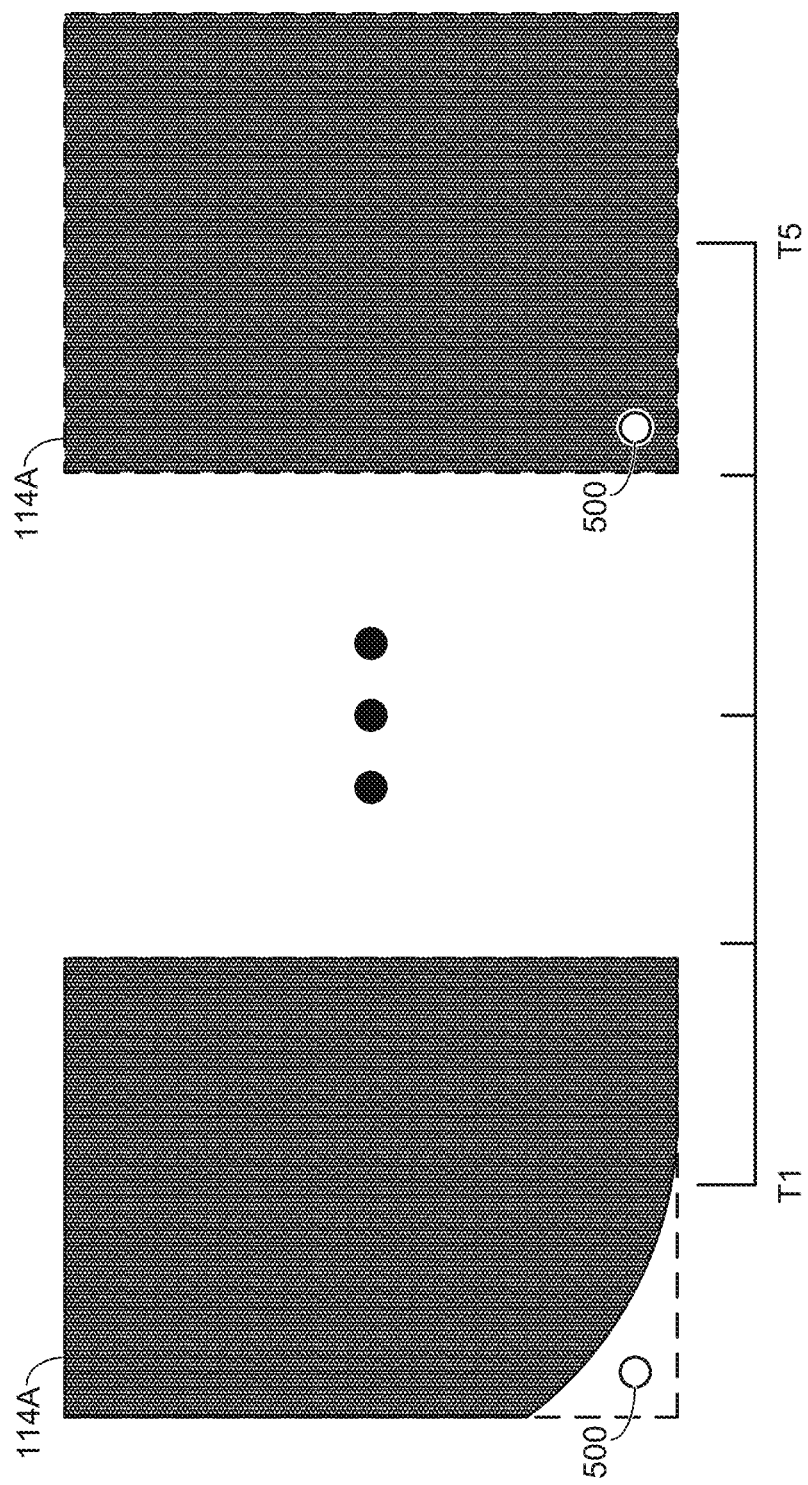
FIG. 5 schematically illustrates touch-sensitive electrodes of a touch-sensitive display on different time frames.

FIG. 5 schematically illustrates another scenario in which a free touch-sensitive electrode is identified. This example focuses specifically on touch-sensitive electrodes 114A of touch-sensitive display 102A. In FIG. 5, touch-sensitive electrodes 114A include a particular touch-sensitive electrode 500. At a particular time frame "T1" most of the touch-sensitive electrodes 114A are affected by proximity of one or more input objects, but touch-sensitive electrode 500 is free. However, at a later time frame "T5," substantially all of the touch-sensitive electrodes 114A are occupied, including electrode 500. As will be described in more detail below, an electrical noise measured at electrode 500 when it was free can be used to estimate the electrical noise affecting electrode 500 when it is later occupied.

Returning briefly to FIG. 2, at 206, method 200 includes measuring the electrical noise affecting the free touch-sensitive electrode. It will be understood that the specific manner in which the electrical noise is measured will vary depending on the implementation, the specific display technology used for displaying image content, and the specific touch-sensing technology used for detecting touch input at the touch-sensitive electrodes. In general, upon determining that a touch-sensitive electrode is free (e.g., not currently detecting proximity of an input object), the touch-sensitive display device may record a signal output by the touch-sensitive electrode as corresponding to electrical noise.

In some cases, the signal output by a free touch-sensitive electrode may be recorded over a series of time frames—e.g., in cases where the electrical noise varies over time. For example, as discussed above, electrical noise related to display of image content may be caused by interaction between the rate at which display content refreshes, and the rate at which touch sampling occurs at the touch-sensitive electrode. Given this, while a particular input object is making contact with the display surface, electrical noise may occur semi-periodically due to the difference between the display refresh rate and the touch sampling rate. However, the semi-periodic rate at which electrical noise occurs may change each time an input object contacts the display surface, and therefore may not remain consistent over time.

Regardless, for the purposes of this disclosure, the touch-sensitive display device first identifies a free touch-sensitive electrode, then measures an electrical noise affecting the free electrode. The specific manner in which the electrode is identified, and the electrical noise is measured, may vary from implementation to implementation. Given this, the nature of the electrical noise (e.g., magnitude, units of measurement, occurrence rate) may similarly vary depending on the implementation.

Continuing with FIG. 2, at 208, method 200 includes, based at least in part on the measured electrical noise affecting the free touch-sensitive electrode, and using a trained neural network, estimating an amount of electrical noise caused by the display of image content that is affecting an occupied touch-sensitive electrode. Notably, as discussed above, an "occupied" touch sensitive electrode is one that is currently affected by proximity of one or more input objects to the one or more touch-sensitive displays of the touch-sensitive display device.

As discussed above, the free touch-sensitive electrode at which the electrical noise is measured may be included in a different touch-sensitive display from the occupied touch-sensitive electrode. This is the scenario schematically illustrated in FIG. 4, in which substantially all of the touch-sensitive electrodes of touch-sensitive display 102B are occupied, including electrode 400B. The identified free electrode 400A is on a separate display (e.g., display 102A) of the same touch-sensitive display device. Nonetheless, the electrical noise measured at free electrode 400A may be used to estimate the electrical noise affecting occupied electrode 400B. This operates under the assumption that electrodes of one touch-sensitive display may experience electrical noise with similar characterization as electrical noise affecting electrodes of a second touch-sensitive display, albeit with a time shift. Given this, the electrical noise measured at one electrode (e.g., a free electrode) may be used to estimate the electrical noise affecting a different electrode (e.g., an occupied electrode) on a different display.

This may be done via a suitable trained neural network. In one example, the trained neural network may be a long short-term memory (LSTM) neural network, although any suitable artificial intelligence (AI) and/or machine learning (ML) technologies may be used in addition to, or instead of, a LSTM neural network. In cases where a neural network is implemented with a loss function, any suitable loss function may be used. As one example, the loss function may be a square-integrable ($L^2$) function. Examples of suitable ML and/or AI technologies will be described below with respect to FIG. 7.

In cases where a trained neural network is used, the neural network may be trained in any suitable way and using any suitable training data. As one example, the trained neural network may be trained using supervised learning based at least in part on a plurality of input/output examples. A first set of the plurality of input/output examples may include at least, (1) as an input, an electrical noise measured at a first training touch-sensitive electrode on a first touch-sensitive display of a touch-sensitive display device, and (2) as an output, an electrical noise measured at a corresponding second training touch-sensitive electrode on a second touch-sensitive display of the touch-sensitive display device. Notably, the training data may include a plurality of different pairs of first and second training electrodes. In this manner, the neural network may be trained to predict, for an input electrical noise measured at a free electrode, an output electrical noise affecting a corresponding electrode on a different touch-sensitive display.

It will be understood that any or all of the touch-sensitive electrodes of a touch-sensitive display device may be used as "training" electrodes for the purposes of training a neural network. In other words, the term "training touch-sensitive electrode" is used to refer to an electrode of a touch-sensitive electrode that is used, during a training phase, to supply input/output examples for training a neural network. The same touch-sensitive electrode may later be used to detect touch inputs during real-world use of the touch-sensitive display device.

Notably, these measurements may be captured on the same time frames relative to each display's internal time sequencing. In other words, the measurement for the first electrode may be taken at a time frame "T1" relative to the first display, and the measurement for the second electrode may also be taken at a time frame "T1" relative to the second display. However, it will be understood that T1 for the first display and T1 for the second display may not occur at exactly the same time. Rather, there may be some degree of time shift between corresponding time frames tracked by each display.

In some cases, the electrical noise measurements used for training the neural network may be taken during manufacture or calibration of each touch-sensitive display device. Additionally, or alternatively, training of the neural network may be repeated or updated over time—e.g., based on real-world use of the device, or via a software update.

The plurality of input/output examples may include electrical noise measurements for substantially all of the touch-sensitive electrodes of the first and second touch-sensitive displays. In other words, each electrode of the first display may be represented in one or more inputs, and each electrode of the second display may be represented in one or more outputs, of the plurality of input/output examples. In other examples, the plurality of input/output examples may represent fewer than all of the touch-sensitive electrodes of the first and second displays.

In some cases, each pair of first and second training electrodes may have substantially similar two-dimensional coordinates relative to each grid of touch-sensitive electrodes—e.g., if a first training electrode is in the upper left corner of the first display, then a corresponding second training electrode may have a corresponding position in the upper left corner of the second display. In other examples, however, the pairs of electrodes used in the plurality of input/output examples may have other suitable spatial relationships with respect to each other and each grid of touch-sensitive electrodes.

The input/output examples described above used, as inputs, electrical noise measurements from electrodes on the first display, and as outputs, electrical noise measurements from electrodes on the second display. However, in some cases, a second set of the plurality of input/output examples may include at least, (1) as an input, an electrical noise measured at a second training touch-sensitive electrode on the second touch-sensitive display of the touch-sensitive display device, and (2) as an output, an electrical noise measured at the corresponding first training touch-sensitive electrode on the first touch-sensitive display of the touch-sensitive display device. Thus, an electrical noise measured at a free electrode on one display can be used to estimate the amount of electrical noise affecting a corresponding electrode on the other display, as the neural network is trained on input/output examples representing both displays.

The present disclosure has primarily focused on single "electrical noise" measurements for each electrode. It will be understood, however, that each electrode may in some cases have both a real value (e.g., in-phase) and an imaginary value (e.g., quadrature). Thus, the set of inputs used in training the neural network may in some cases have a size of N×2, where N is the total number of electrodes on which the neural network is trained.

This discussion has primarily focused on a scenario in which the free touch-sensitive electrode and occupied touch-sensitive electrode are on different touch-sensitive displays. As discussed above, however, in some cases the electrical noise measured at the free touch-sensitive electrode may be used to estimate the electrical noise affecting the same electrode on a later time frame, when the electrode is occupied. In other words, the occupied touch-sensitive electrode is affected by the proximity of one or more input objects on a current time frame of a plurality of sequential time frames, and was identified as the free touch-sensitive electrode on a prior time frame that occurred one or more time frames before the current time frame.

This is the scenario schematically illustrated in FIG. 5, in which electrode 500 is free on a first time frame T1 and occupied on a later time frame T5. The electrical noise measured at electrode 500 on frame T1 may be used to estimate the amount of electrical noise affecting electrode 500 on current time frame T5. In this example, on the current time frame, every touch-sensitive electrode of the plurality of touch-sensitive electrodes 114A is affected by proximity of one or more input objects—e.g., substantially all of the electrodes 114A are occupied. Furthermore, the amount of electrical noise affecting the occupied touch-sensitive electrode may further estimated by the trained neural network based at least in part on a quantity of the one or more time frames between the prior time frame (e.g., T1) and the current time frame (e.g., T5). In this non-limiting example, there are four time frames between the prior time frame and the current time frame. It will be understood, however, that the techniques described herein may be applied for a wide range of time intervals. In this manner, the touch-sensitive display device may account for electrical noise based on measurements collected from a touch-sensitive electrode that was free any suitable number of frames in the past, which may allow electrical noise to be corrected for under a wider range of use cases.

Again, this may be done via a suitable trained neural network, and/or other suitable ML/AI technologies. For example, the trained neural network may be a LSTM neural network. In cases where a neural network is implemented with a loss function, any suitable loss function may be used. As one example, the loss function may be a square-integrable (L2) function. Examples of suitable ML and/or AI technologies will be described below with respect to FIG. 7.

In cases where a trained neural network is used, the neural network may be trained in any suitable way and using any suitable training data. As one example, the trained neural network may be trained using supervised learning based at least in part on a plurality of input/output examples. Each input/output example may include at least, (1) as inputs, an electrical noise measured at a training touch-sensitive electrode on an input time frame, and a number of time frames occurring between the input time frame and a later output time frame; and (2) as an output, an electrical noise measured at the training touch-sensitive electrode on the output time frame. In other words, the neural network may be trained based on two different electrical noise measurements taken at the same electrode at different times, as well as a number of time frames separating the two measurements. In this manner, when a particular electrode is occupied on a current time frame T, and the electrode was free on an earlier time frame T-K, the neural network may be trained to estimate the amount of electrical noise affecting the electrode at time T, based on the electrical noise measured at T-K and the value of K.

The trained neural network may be trained on any suitable number of values for K—e.g., the time difference between the input measurement and the output measurement. In other words, for each electrode, the neural network may be trained with input/output values separated by a plurality of different time intervals—e.g., one input/output pair for a K value of 1, another input/output pair for a K value of 2, and so on. This may continue up to a maximum frame interval threshold, which may have any suitable value depending on the implementation. As one non-limiting example, a maximum K value of 200 frames may be used. This may be suitable, as electrical noise caused by display of image content often occurs at a semi-periodic rate as discussed above. Thus, any electrical noise is likely to be represented at least once before K reaches 200 frames.

As discussed above, in some cases, the electrical noise measurements used for training the neural network may be taken during manufacture or calibration of each touch-sensitive display device. Additionally, or alternatively, training of the neural network may be repeated or updated over time—e.g., based on real-world use of the device, or via a software update.

The plurality of input/output examples may include electrical noise measurements for substantially all of the touch-sensitive electrodes. In other words, each electrode of any particular touch-sensitive display may be represented in the plurality of input/output examples. In other examples, however, the plurality of input/output examples may represent fewer than all of the touch-sensitive electrodes of the first and second displays.

Furthermore, as discussed above, the training data need not only comprise single "electrical noise" measurements for each electrode. Rather, each electrode may in some cases have both a real value (e.g., in-phase) and an imaginary value (e.g., quadrature). Thus, the set of inputs used in training the neural network may in some cases have a size of N×3, where N is the total number of electrodes on which the network is trained, including each electrode's real value, imaginary value, and K value for the current training example.

In any case, as discussed above, a trained neural network may be used to estimate the amount of electrical noise affecting an occupied touch-sensitive electrode, based at least in part on an electrical noise measured at a free touch-sensitive electrode. This process is schematically illustrated with respect to FIG. 6.

Figure 6:
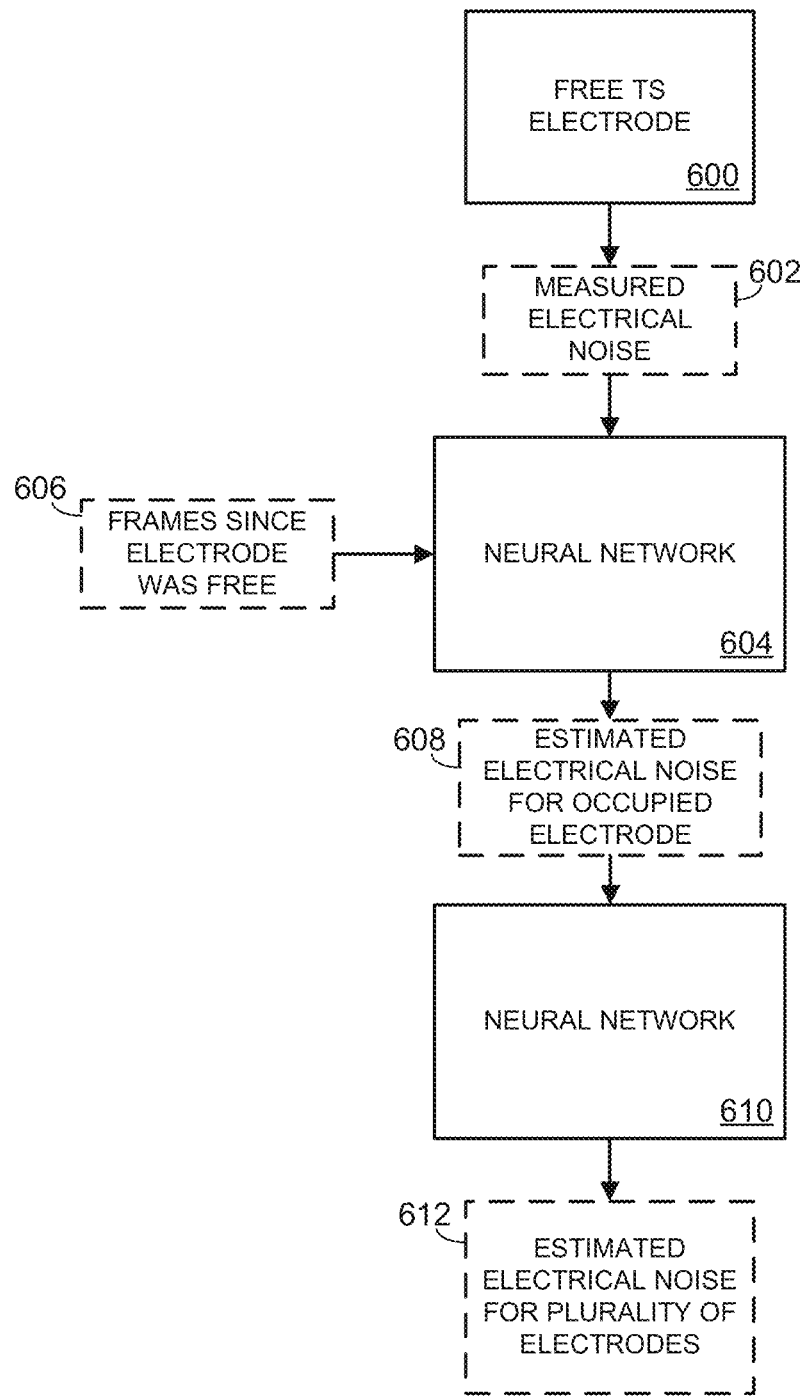
FIG. 6 schematically illustrates estimation of electrical noise affecting touch-sensitive electrodes.

In FIG. 6, a free touch-sensitive electrode 600 is identified as described above. From there, the touch-sensitive display device measures an electrical noise 602 affecting the free touch-sensitive electrode. The electrical noise is supplied to a neural network 604 trained as described above. In cases where the free touch-sensitive electrode is the same as the occupied touch-sensitive electrode, the neural network may additionally receive a number of frames 606 since the electrode was last free (e.g., a K value as described above). Based on these inputs, the trained neural network outputs an estimated electrical noise 608 affecting an occupied touch-sensitive electrode.

In some cases, there may be multiple sequential frames in which no touch-sensitive electrodes on a given touch-sensitive display are free. Thus, in some cases, the touch-sensitive display device may further use the trained neural network to estimate the amount of electrical noise affecting the occupied touch-sensitive electrode on each of one or more time frames subsequent to the current time frame. For example, when the occupied touch-sensitive electrode is the same as the current touch-sensitive electrode, the electrical noise affecting the electrode on the prior time frame may be supplied to the trained neural network on each of a series of subsequent time frames, along with updated K values, to give updated estimates of the current electrical noise affecting the electrode. This may continue until a new free touch-sensitive electrode is detected, or a maximum frame interval threshold is reached. As discussed above, the frame interval threshold may have any suitable value (e.g., a value of 200 time frames).

The present disclosure has thus far focused on a scenario in which the electrical noise measured at a single free electrode is used to estimate an electrical noise affecting a single occupied electrode. In some cases, however, after using one neural network to estimate the electrical noise affecting the occupied electrode, a second neural network may be used to estimate the electrical noise affecting a plurality of additional occupied touch-sensitive electrodes. In other words, the trained neural network described above may be a first touch-sensitive electrode, and the touch-sensitive display device may be configured to use a second trained neural network to estimate an amount of electrical noise caused by the display of image content that is affecting each of the plurality of touch-sensitive electrodes on the same touch-sensitive display as the occupied touch-sensitive electrode. This may be done based at least in part on the electrical noise affecting the occupied touch-sensitive electrode.

This is also illustrated in FIG. 6. As shown, trained neural network 604 outputs an estimate 608 of the electrical noise affecting the occupied electrode. This estimate is provided to a second trained neural network 610, which outputs an estimate 612 of the electrical noise affecting each of a plurality of other occupied electrodes—e.g., substantially all of the touch-sensitive electrodes on the same touch-sensitive display as the occupied electrode.

As with the first neural network, any suitable technologies may be used to implement the second trained neural network. In some examples, the second trained neural network may be a convolutional neural network (CNN), as it is believed that CNNs are well-suited for accounting for spatial differences between different touch-sensitive electrodes as will be described in more detail below. Additional non-limiting examples of suitable ML and/or AI technologies will be described below with respect to FIG. 7.

In cases where two different neural networks are used, the first neural network may generally deal with temporal relationships between different touch-sensitive electrodes, while the second neural network may deal with spatial relationships between different touch-sensitive electrodes. Depending on the nature of the image content presented on the touch-sensitive display, the electrical noise affecting one electrode may be related to, but different from, the electrical noise affecting a different electrode on the same display. In practice, in has been observed that the variety of different types of image content that can be presented on a touch-sensitive display will result in a relatively limited number of different spatial patterns relating to electrical noise affecting the display's touch-sensitive electrodes. In other words, the second trained neural network can be trained on a relatively small number of different spatial patterns (e.g., 20 different patterns), and this will be sufficient to capture the majority of cases that the neural network will be exposed to during actual use.

As with the first neural network described above, training of the second neural network may be done in any suitable way. For example, the training data for the second neural network may include, as an input, an electrical noise measured at an input electrode, and as outputs, electrical noise affecting a plurality of other electrodes on the same display. Multiple training examples may in some cases be provided for each electrode, corresponding to different types of visual content presented on the display.

Furthermore, the present disclosure has primarily focused on a scenario in which only one free electrode is identified. It will be understood that, in other implementations, two or more different free touch-sensitive electrodes may be identified, and electrical noise affecting each of the two or more different electrodes may be measured. From there, the electrical noise measured at the two or more different electrodes may be supplied to one or more trained neural networks to estimate the electrical noise affecting one or more occupied touch-sensitive electrodes. This may allow the electrical noise affecting the occupied electrodes to be more accurately characterized and subtracted, at the expense of increased computational complexity.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
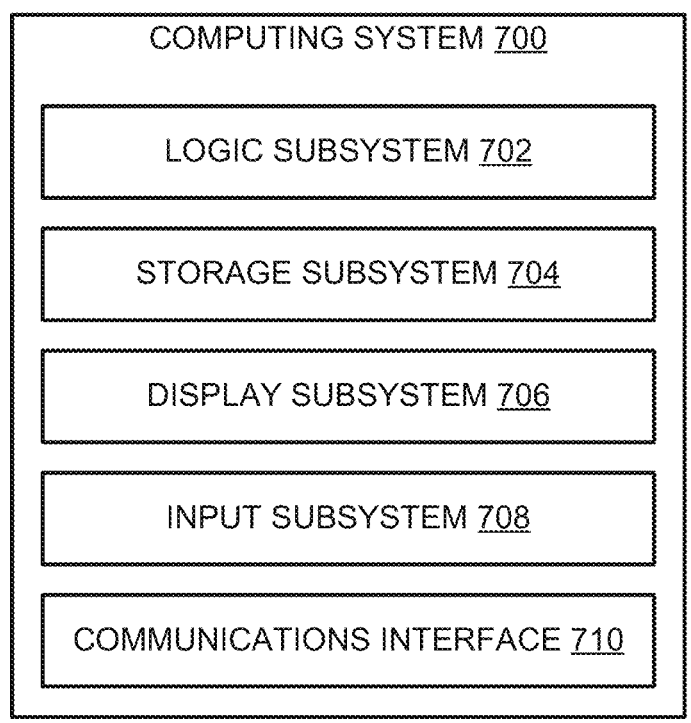
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a touch-sensitive display device comprises: one or more touch-sensitive displays, each touch-sensitive display including a plurality of touch-sensitive electrodes; a logic subsystem; and a storage subsystem holding instructions executable by the logic subsystem to: display image content on the one or more touch-sensitive displays; identify a free touch-sensitive electrode on the one or more touch-sensitive displays that is (1) at least temporarily unaffected by proximity of one or more input objects to the one or more touch-sensitive displays, and (2) affected by an electrical noise caused by display of image content on the one or more touch-sensitive displays; measure the electrical noise affecting the free touch-sensitive electrode; and based at least in part on the measured electrical noise affecting the free touch-sensitive electrode, and using a trained neural network, estimate an amount of electrical noise caused by the display of image content that is affecting an occupied touch-sensitive electrode, the occupied touch-sensitive electrode being affected by proximity of the one or more input objects to the one or more touch-sensitive displays. In this example or any other example, the occupied touch-sensitive electrode is affected by the proximity of the one or more input objects on a current time frame of a plurality of sequential time frames, and the occupied touch-sensitive electrode was identified as the free touch-sensitive electrode on a prior time frame occurring one or more time frames before the current time frame. In this example or any other example, the amount of electrical noise affecting the occupied touch-sensitive electrode is further estimated by the trained neural network based at least in part on a quantity of the one or more time frames between the prior time frame and the current time frame. In this example or any other example, the trained neural network is trained based at least in part on a plurality of input/output examples, wherein each input/output example includes at least, (1) as inputs, an electrical noise measured at a training touch-sensitive electrode on an input time frame, and a number of time frames occurring between the input time frame and a later output time frame, and (2) as an output, an electrical noise measured at the training touch-sensitive electrode on the output time frame. In this example or any other example, on the current time frame, every touch-sensitive electrode of the plurality of touch-sensitive electrodes is affected by proximity of the one or more input objects. In this example or any other example, the instructions are further executable to, using the trained neural network, estimate an amount of electrical noise affecting the occupied touch-sensitive electrode on each of one or more time frames subsequent to the current time frame, based at least in part on the electrical noise affecting the free touch-sensitive electrode on the prior time frame, until a new free touch-sensitive electrode is identified or a frame interval threshold is reached. In this example or any other example, the one or more touch-sensitive displays include two touch-sensitive displays. In this example or any other example, the free touch-sensitive electrode is included in a different touch-sensitive display from the occupied touch-sensitive electrode. In this example or any other example, the trained neural network is trained based at least in part on a plurality of input/output examples, and wherein a first set of the plurality of input/output examples include at least, (1) as an input, an electrical noise measured at a first training touch-sensitive electrode on a first touch-sensitive display of the touch-sensitive display device, and (2) as an output, an electrical noise measured at a second training touch-sensitive electrode on a second touch-sensitive display of the touch-sensitive display device. In this example or any other example, a second set of the plurality of input/output examples include at least, (1) as an input, an electrical noise measured at the second training touch-sensitive electrode on the second touch-sensitive display of the touch-sensitive display device, and (2) as an output, an electrical noise measured at the first training touch-sensitive electrode on the first touch-sensitive display of the touch-sensitive display device. In this example or any other example, the trained neural network is a first trained neural network, and the instructions are further executable to, based at least in part on the electrical noise affecting the occupied touch-sensitive electrode, and using a second trained neural network, estimate an amount of electrical noise caused by the display of image content that is affecting each of the plurality of touch-sensitive electrodes on the same touch-sensitive display as the occupied touch-sensitive electrode. In this example or any other example, the first trained neural network is a long short-term memory (LSTM) neural network. In this example or any other example, the second trained neural network is a convolutional neural network (CNN).

In an example, a method for a touch-sensitive display device comprises: displaying image content on one or more touch-sensitive displays of the touch-sensitive display device, each of the one or more touch-sensitive displays including a plurality of touch-sensitive electrodes; identifying a free touch-sensitive electrode on the one or more touch-sensitive displays that is (1) at least temporarily unaffected by proximity of one or more input objects to the one or more touch-sensitive displays, and (2) affected by an electrical noise caused by display of image content on the one or more touch-sensitive displays; measuring the electrical noise affecting the free touch-sensitive electrode; and based at least in part on the measured electrical noise affecting the free touch-sensitive electrode, and using a trained neural network, estimating an amount of electrical noise caused by the display of image content that is affecting an occupied touch-sensitive electrode, the occupied touch-sensitive electrode being affected by proximity of the one or more input objects to the one or more touch-sensitive displays. In this example or any other example, the occupied touch-sensitive electrode is affected by the proximity of the one or more input objects on a current time frame of a plurality of sequential time frames, and the occupied touch-sensitive electrode was identified as the free touch-sensitive electrode on a prior time frame occurring one or more time frames before the current time frame. In this example or any other example, the amount of electrical noise affecting the occupied touch-sensitive electrode is further estimated by the trained neural network based at least in part on a quantity of the one or more time frames between the prior time frame and the current time frame. In this example or any other example, the one or more touch-sensitive displays include two touch-sensitive displays. In this example or any other example, the free touch-sensitive electrode is included in a different touch-sensitive display from the occupied touch-sensitive electrode. In this example or any other example, the trained neural network is a first trained neural network, and the method further comprises, based at least in part on the electrical noise affecting the occupied touch-sensitive electrode, and using a second trained neural network, estimating an amount of electrical noise caused by the display of image content that is affecting each of the plurality of touch-sensitive electrodes on the same touch-sensitive display as the occupied touch-sensitive electrode.

In an example, a touch-sensitive display device comprises: first and second touch-sensitive displays, each touch-sensitive display including a plurality of touch-sensitive electrodes; a logic subsystem; and a storage subsystem holding instructions executable by the logic subsystem to: display image content on the first and second touch-sensitive displays; identify a free touch-sensitive electrode on the first touch-sensitive display that is (1) at least temporarily unaffected by proximity of one or more input objects to the first touch-sensitive display, and (2) affected by an electrical noise caused by display of image content on the first touch-sensitive display; measure the electrical noise affecting the free touch-sensitive electrode; and based at least in part on the measured electrical noise affecting the free touch-sensitive electrode, and using a trained neural network, estimate an amount of electrical noise caused by the display of image content that is affecting an occupied touch-sensitive electrode on the second touch-sensitive display, the occupied touch-sensitive electrode being affected by proximity of the one or more input objects to the second touch-sensitive display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
one or more touch-sensitive displays, each touch-sensitive display including a plurality of touch-sensitive electrodes;
a logic subsystem; and
a storage subsystem holding instructions executable by the logic subsystem to:
display image content on the one or more touch-sensitive displays;
identify a free touch-sensitive electrode on the one or more touch-sensitive displays that is (1) at least temporarily unaffected by proximity of one or more input objects to the one or more touch-sensitive displays, and (2) affected by an electrical noise caused by display of image content on the one or more touch-sensitive displays;
measure the electrical noise affecting the free touch-sensitive electrode; and
based at least in part on the measured electrical noise affecting the free touch-sensitive electrode, and using a trained neural network, estimate an amount of electrical noise caused by the display of image content that is affecting an occupied touch-sensitive electrode, the occupied touch-sensitive electrode being affected by proximity of the one or more input objects to the one or more touch-sensitive displays, wherein the occupied touch-sensitive electrode is affected by the proximity of the one or more input objects on a current time frame, and the occupied touch-sensitive electrode was identified as the free touch-sensitive electrode on a prior time frame occurring one or more time frames before the current time frame.

2. The touch-sensitive display device of claim 1, wherein, on the current time frame, every touch-sensitive electrode of the plurality of touch-sensitive electrodes is affected by proximity of the one or more input objects.

3. The touch-sensitive display device of claim 1, wherein the instructions are further executable to, using the trained neural network, estimate an amount of electrical noise affecting the occupied touch-sensitive electrode on each of one or more time frames subsequent to the current time frame, based at least in part on the electrical noise affecting the free touch-sensitive electrode on the prior time frame, until a new free touch-sensitive electrode is identified or a frame interval threshold is reached.

4. The touch-sensitive display device of claim 1, wherein the amount of electrical noise affecting the occupied touch-sensitive electrode is further estimated by the trained neural network based at least in part on a quantity of the one or more time frames between the prior time frame and the current time frame.

5. The touch-sensitive display device of claim 4, wherein the trained neural network is trained based at least in part on a plurality of input/output examples, wherein each input/output example includes at least, (1) as inputs, an electrical noise measured at a training touch-sensitive electrode on an input time frame, and a number of time frames occurring between the input time frame and a later output time frame, and (2) as an output, an electrical noise measured at the training touch-sensitive electrode on the output time frame.

6. The touch-sensitive display device of claim 1, wherein the trained neural network is a first trained neural network, and the instructions are further executable to, based at least in part on the electrical noise affecting the occupied touch-sensitive electrode, and using a second trained neural network, estimate an amount of electrical noise caused by the display of image content that is affecting each of the plurality of touch-sensitive electrodes on the same touch-sensitive display as the occupied touch-sensitive electrode.

7. The touch-sensitive display device of claim 6, wherein the first trained neural network is a long short-term memory (LSTM) neural network.

8. The touch-sensitive display device of claim 6, wherein the second trained neural network is a convolutional neural network (CNN).

9. The touch-sensitive display device of claim 1, wherein the one or more touch-sensitive displays include two touch-sensitive displays.

10. The touch-sensitive display device of claim 9, wherein the free touch-sensitive electrode is included in a different touch-sensitive display from the occupied touch-sensitive electrode.

11. The touch-sensitive display device of claim 10, wherein the trained neural network is trained based at least in part on a plurality of input/output examples, and wherein a first set of the plurality of input/output examples include at least, (1) as an input, an electrical noise measured at a first training touch-sensitive electrode on a first touch-sensitive display of the touch-sensitive display device, and (2) as an output, an electrical noise measured at a second training touch-sensitive electrode on a second touch-sensitive display of the touch-sensitive display device.

12. The touch-sensitive display device of claim 11, wherein a second set of the plurality of input/output examples include at least, (1) as an input, an electrical noise measured at the second training touch-sensitive electrode on the second touch-sensitive display of the touch-sensitive display device, and (2) as an output, an electrical noise measured at the first training touch-sensitive electrode on the first touch-sensitive display of the touch-sensitive display device.

13. A method for a touch-sensitive display device, the method comprising:
  displaying image content on two or more touch-sensitive displays of the touch-sensitive display device, each of the two or more touch-sensitive displays including a plurality of touch-sensitive electrodes;
  identifying a free touch-sensitive electrode on the two or more touch-sensitive displays that is (1) at least temporarily unaffected by proximity of one or more input objects to the two or more touch-sensitive displays, and (2) affected by an electrical noise caused by display of image content on the two or more touch-sensitive displays;
  measuring the electrical noise affecting the free touch-sensitive electrode; and
  based at least in part on the measured electrical noise affecting the free touch-sensitive electrode, and using a trained neural network, estimating an amount of electrical noise caused by the display of image content that is affecting an occupied touch-sensitive electrode, the occupied touch-sensitive electrode being affected by proximity of the one or more input objects to the two or more touch-sensitive displays.

14. The method of claim 13, wherein the free touch-sensitive electrode is included in a different touch-sensitive display of the two or more touch-sensitive displays from the occupied touch-sensitive electrode.

15. The method of claim 13, wherein the trained neural network is a first trained neural network, and the method further comprises, based at least in part on the electrical noise affecting the occupied touch-sensitive electrode, and using a second trained neural network, estimating an amount of electrical noise caused by the display of image content that is affecting each of the plurality of touch-sensitive electrodes on the same touch-sensitive display of the two or more touch-sensitive displays as the occupied touch-sensitive electrode.

16. The method of claim 13, wherein the occupied touch-sensitive electrode is affected by the proximity of the one or more input objects on a current time frame of a plurality of sequential time frames, and the occupied touch-sensitive electrode was identified as the free touch-sensitive electrode on a prior time frame occurring one or more time frames before the current time frame.

17. The method of claim 16, wherein the amount of electrical noise affecting the occupied touch-sensitive electrode is further estimated by the trained neural network based at least in part on a quantity of the one or more time frames between the prior time frame and the current time frame.

18. A touch-sensitive display device, comprising:
  first and second touch-sensitive displays, each touch-sensitive display including a plurality of touch-sensitive electrodes;
  a logic subsystem; and
  a storage subsystem holding instructions executable by the logic subsystem to:
    display image content on the first and second touch-sensitive displays;
    identify a free touch-sensitive electrode on the first touch-sensitive display that is (1) at least temporarily unaffected by proximity of one or more input objects to the first touch-sensitive display, and (2) affected by an electrical noise caused by display of image content on the first touch-sensitive display;
    measure the electrical noise affecting the free touch-sensitive electrode; and
    based at least in part on the measured electrical noise affecting the free touch-sensitive electrode, and using a trained neural network, estimate an amount of electrical noise caused by the display of image content that is affecting an occupied touch-sensitive electrode on the second touch-sensitive display, the occupied touch-sensitive electrode being affected by proximity of the one or more input objects to the second touch-sensitive display.

* * * * *